United States Patent Office 3,403,703
Patented Oct. 1, 1968

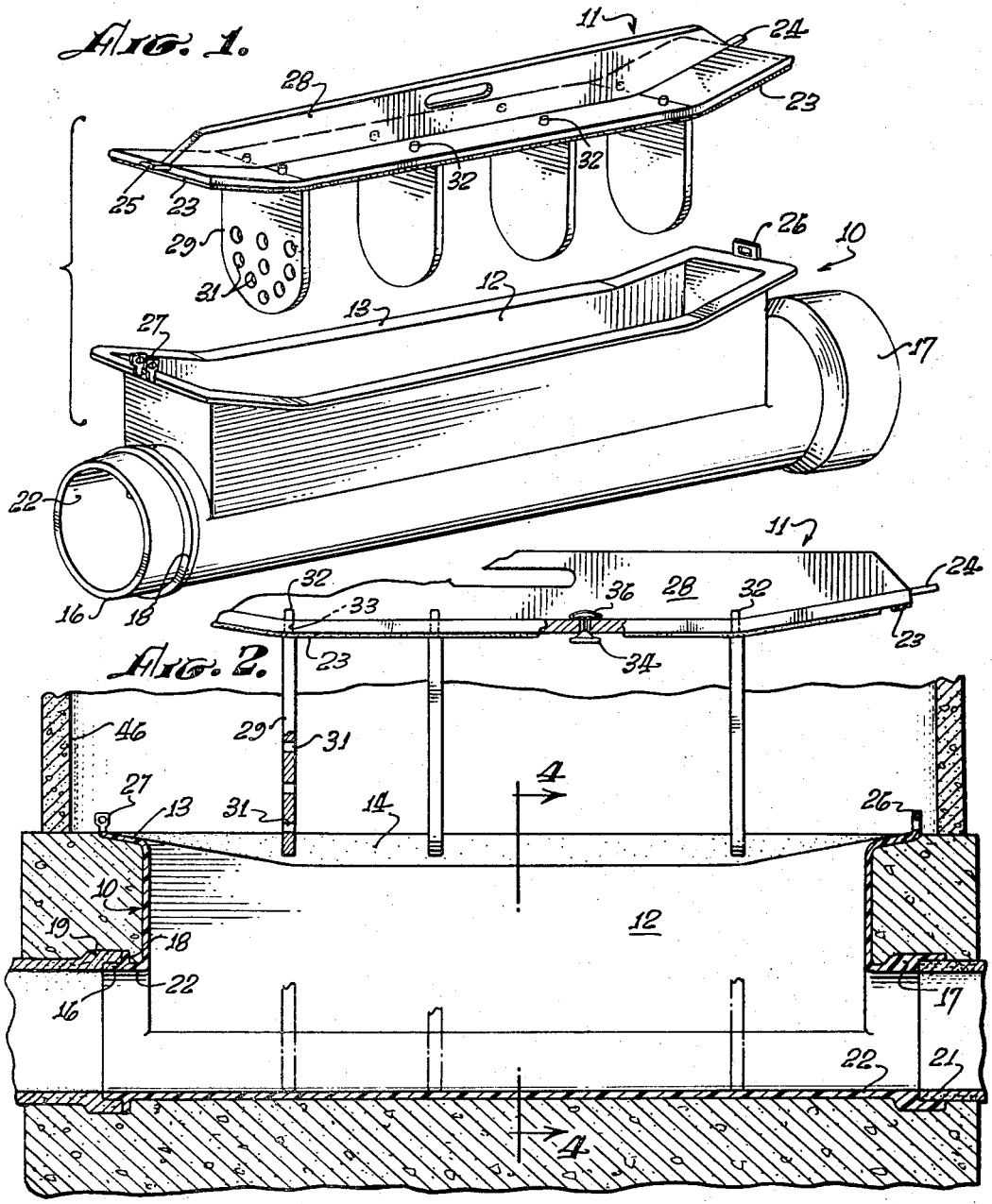

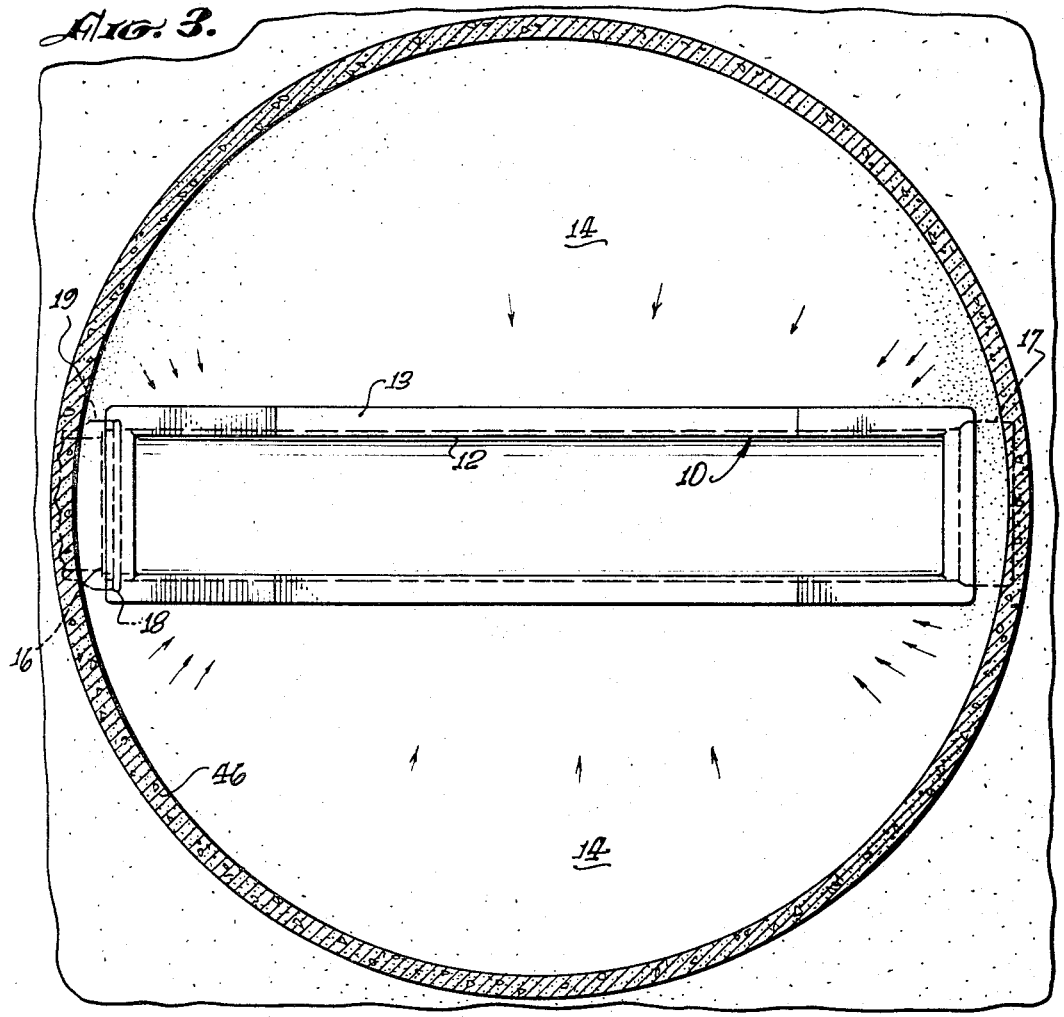
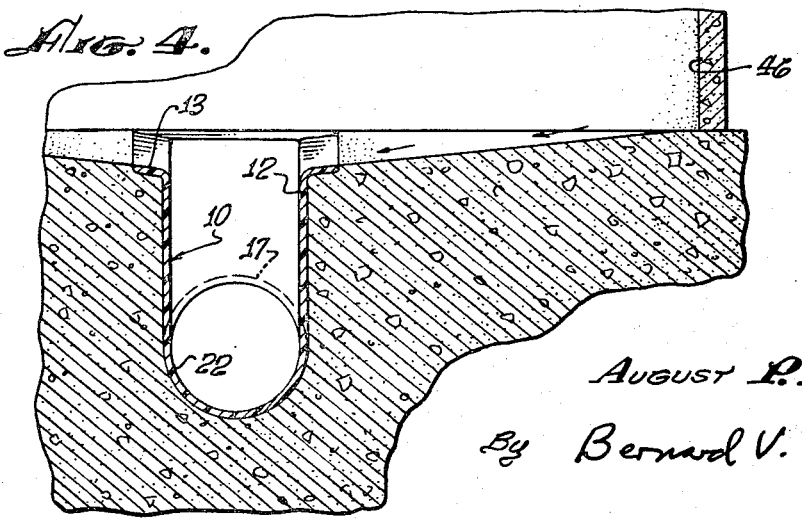

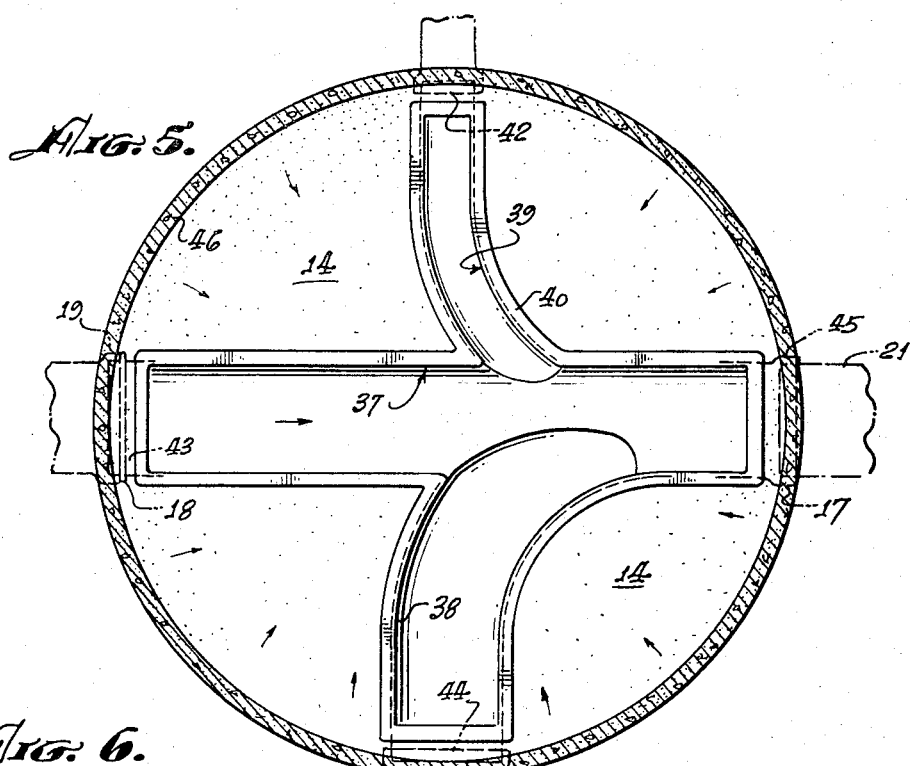
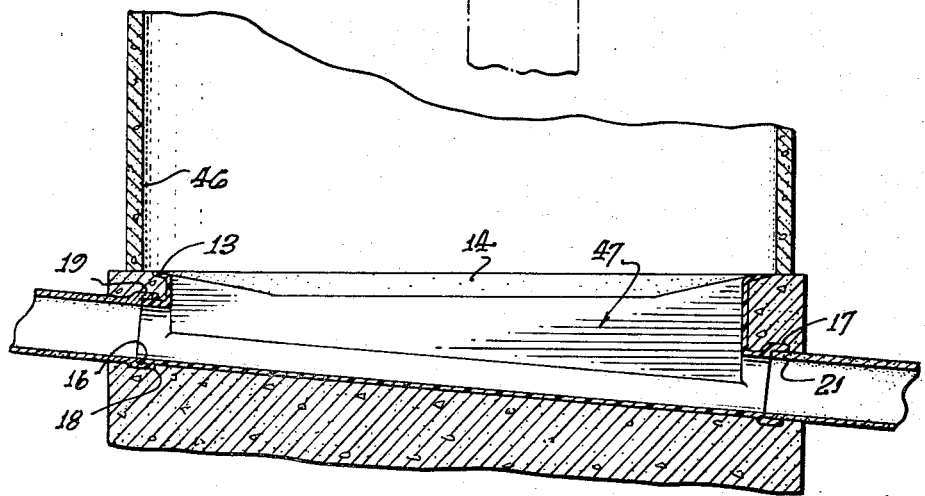

3,403,703
ACCESS CHANNEL
August P. Reimann, 12600 Breezewood, Apt. No. 1,
La Mirada, Calif. 90638
Filed Oct. 8, 1965, Ser. No. 494,041
1 Claim. (Cl. 138—92).

ABSTRACT OF THE DISCLOSURE

A preformed access channel comprising a hollow channel member with at least two opposite end openings adapted for connecting the channel member into drainage lines, a side opening in the channel member to provide access to the interior thereof, an interior surface in the channel member shaped to facilita'e line clean-out operations, and a lid member shaped to substantially cover and close the side opening in the channel member.

The present invention relates to an access channel for liquid drainage lines such as sewer lines, water drainage lines and the like. More particularly, the present invention relates to a preformed access channel intended for utilization in manholes and other pipeline entrances.

In the normal drainage and sewer line, buried beneath the surface of the earth, the line is interrupted every so of.en by a manhole or other well like entrance, the distance between such manholes often being determined by government codes or regulations. The drainage or sewer line, at the bottom of such a manhole, is not in the form of a closed pipe but is an open channel through a bed of concrete or cement. This channel provides access to the line to facilitate line clearing operations when stoppage occurs. It also permits the cleaning out of the line, when construction debris may be in the line.

The access channel at the bottom of a manhole also allows gas to escape from the pipe line and permits surface water directed into the manhole to enter the pipe line and flow off. It is also normal practice to have a manhole, with access channel, at the junction of sewer lines. This practice reduces the difficulties that arise in trying to carry out line clearing operations around a corner.

The practice generally followed today in the construction of manholes and attendant access channels is to shape each channel in each manhole by hand, using concrete or cement. The disadvantages of this approach are the time and labor involved to hand form and construct such a cement channel, the deteriorating effect of sewer acids and gases on cement, and the difficulty in hand forming a channel free from high spots, low spots, pits, or snags that will start pipeline stoppage buildup.

One approach that has been tried to minimize these problems is the use of one half of a piece of normal clay pipe, cut in half length-wise, with the half pipe forming the bottom, rounded portion of the channel. This method still requires considerable hand crafting of the channel, and still directly exposes cement to sewer acids.

Another approach to the problem has been the precasting of the entire cement bed to be deposited in the bottom of the manhole, channel and all, and then using a crane to lower this large block of cement into the bottom of the manhole. This method still employs cement, but it is also subject to another disadvantage in that the floor prepared to receive the block of cement must be exactly the right depth to cause the channel to be on the same level as the pipe line. This often necessitates a number of removal and reinsertion operations, using a crane of course, while the manhole floor is raised or lowered.

Finally, there is the problem that all the channels must pass a rigid inspection by the local cognizant authorities, and the removal of a defective cement channel by air hammer or crane is a costly operation. The matter of "passing inspection" is no small problem in this area of the construction field.

The present invention therefore has a number of objects, one of which is to reduce the cost of access channels in pipe lines.

Another object is to provide a smooth channel surface to reduce line stoppage problems.

Another object is to provide a sewer action resistant access channel.

Another object is to provide a pre-formed access channel that is light weight, yet rigid enough to withstand being implanted in fresh concrete or other fill material.

Another object is to provide an access channel which keeps debris out of the pipe line during construction operations, and thereafter if desired.

And still other objects of the present invention will become obvious from the description subsequently set forth herein.

The drawings of the invention disclose merely preferred embodiments, and do not disclose all the various embodiments that could be constructed.

FIGURE 1 of the drawings shows an isometric view of a pre-formed access channel comprising a channel member 10 and a lid member 11, the lid member shown raised above the channel member, ready to be lowered thereon.

FIGURE 2 is a side view of the invention, showing the structure in cross section and planted in concrete at the bottom of a manhole. Again, the lid member is shown raised above the channel member, as on removal or preparation for lowering onto the channel member.

FIGURE 3 is a plan view looking down into a manhole, showing the channel member with lid removed, and illustrating what the channel member looks like when in use without the lid member. Note that the surrounding drainage surface slopes down to the access channel.

FIGURE 4 is a cross sectional view of the channel member taken along line 4—4 of FIGURE 2.

FIGURE 5 is a plan view looking down into a manhole, showing a channel member having a plurality of branch channel members fairing into and intersecting a main channel member, for use where pipelines must join. This view shows the channel member with lid member removed.

FIGURE 6 is a side view of a channel member 10, in cross section and imbedded in concrete at the bottom of a manhole, in which the channel member has a rapid drop along its length to accommodate a rapidly dropping pipeline.

For a description of the structure of a preferred embodiment of the present invention, reference is now made to FIGURE 1. As illustrated, the apparatus has two basic members, a channel member 10 and a lid member 11 and both members are preformed from plastic, preferably, or other sewer action resistant material. Channel member 10 has a U-shaped cross section along most of its length, having an opening 12 along most of its length. The opening 12 has a flanged rim 13 to facilitate fairing a surrounding drainage surface into opening 12. The U-shaped cross section and the purpose of flanged rim 13 can be seen from the illustration of FIGURE 4 which shows a drainage surface 14 fairing into flanged rim 13.

Channel member 10 has a cylindrical inlet spigot 16 at one end and outlet bell 17 at the other end. The inlet spigot has a plastic ring 18 positioned around the exterior thereof to facilitate the sealing operation that seals the inlet spigot into an outlet bell of a pipeline, such as pipeline outlet bell 19 shown in FIGURE 2. The outlet bell 17 of the channel member is of the proper size for sealing operations that seal it to the inlet spigot of a pipeline, such as pipeline inlet spigot 21 shown in FIGURE 2.

The interior surface 22 of channel member 10 is smooth, having no high or low spots, and offers an unrestricted flow path in a pipeline in which it is interconnected.

As illustrated in FIGURE 1, the lid member 11 is of such a size and shape as to fit upon the flanged rim 13 of channel member 10, thereby closing the opening 12 of channel member 10. A seal 23 of soft plastic, or other sewer action resistant material, is secured to the bottom of the lid member in position to contact the flanged rim 13 and thereby provide a substantially water tight seal between lid member 11 and channel member 10 when they are put together. Where it is desired to secure or lock the lid to the channel member, the lid can be provided with bars 24 and 25, and the channel member can be provided with a slot member 26 to receive bar 24, and a groove member 27 to receive bar 25. A padlock placed through the holes of groove member 27 will then lock the lid to the channel member. Of course, this particular securing and locking provision is only one of many ways the same function could be achieved.

The lid member is shown with a handle 28 to facilitate manual carrying, placement, and removal of the lid member. The particular handle configuration shown in FIGURE 1 also lends strength and rigidity to lid member 11. In addition to a handle, lid member 11 has a plurality of ribs 29 extending from the bottom of the lid member. These ribs 29 are U-shaped and of such size as to just fit into the U-shaped cross section portion of channel member 10 when lid member 11 is placed upon channel member 10. When positioned in channel member 10, the ribs 29 contact the interior wall thereof. If desired, the ribs can be provided with holes 31 to permit the passage of water and small particles through the channel member, while stopping the passage of larger debris. The holes could also be diminished in size from one rib to the next to provide a series of successively smaller filter traps. The holes in the ribs could be used in pipeline flushing operations to stop large debris at the manhole so that it could be removed from the pipeline.

While it may not be desired in all installations, the preferred embodiment of FIGURE 1 shows the ribs 29 to be removable from lid member 11. The ribs are made removable by having pins 32 which fit snugly into holes 33 of the lid. Other attachment methods can be used, but this method provides a lid with holes therein once the ribs are removed, and the lid can be kept on the channel member after construction and holes 33 will allow water to drain into the channel member, and gas to escape therefrom. If it is desired to prevent water from flowing up through the holes, such as during post construction pipeline flushing, under pressure, or during "balling" operations when an inflated rubber ball is forced through the pipeline, a buoyant float or bobber 34, positioned in the holes 33 by wire 36 as illustrated in FIGURE 2, can be used to prevent water from escaping from the channel member, while still allowing water to drain into, and gas to escape from, the channel member during normal operations.

It can be readily seen that the structure of the present invention is not limited to straight channel members. While the channel member is substantially longitudinal, still it may have a 30° bend, 60° bend, or whatever bend is desired. Similarly, the lid member can be constructed to fit channel members with bends in them.

It can also be seen that the structure of the present invention, in alternative configurations, can accommodate a number of pipelines joining together. FIGURE 5 shows such an alternate configuration in which the access channel comprises a main channel member 37 and branch channel members 38 and 39 converging with and fairing into the main channel member 37. Each channel member, of course, has the usual U-shaped cross section, and a flanged rim, indicated by numeral 40. Each channel member has its own inlet spigot, indicated by numerals 42, 43 and 44. In addition, the access channel has the usual outlet bell, indicated by numeral 45. The lid member for this plural branch access channel is not shown, but, for ease of handling, a separate lid for each channel 37, 38 and 39 is the preferred embodiment, constructed along the lines of the lid shown in FIGURE 1. Of course, a single lid could be manufactured and used if desired, but handling it at the bottom of a particular manhole might be awkward. The manhole walls, indicated by numeral 46 in FIGURES 2 through 6, generally do not afford a lot of room to work in.

Another alternate configuration is shown in FIGURE 6. Here a channel member 47 is shown with a greater depth at the outlet bell end than at the inlet spigot end. This is to permit the channel member to be connected in a pipeline having a rapid rate of drop.

The structure of the invention having now been described, attention is next directed to the manner in which the present invention is employed. As previously indicated, the pre-formed access channel is particularly suited for use in manholes, and as a pipeline is laid up to a manhole the pre-formed access channel is connected thereto, and the pipeline laying can continue on past the manhole without any interruption, leaving the preformed access channel to be imbedded in cement.

Since channel member 10 is constructed from lightweight plastic it is possible that the pouring and tamping of cement around its exterior might alter its shape, or even crack its plastic wall. To prevent this, the lid member 11 is positioned on channel member 10 during the imbedding operation and the ribs 29 of lid member 11, being of sufficient strength to impart substantial rigidity to channel member 11, prevent alternation of the shape of the structure. The lid member also keeps construction debris out of the pipeline. The plastic used in the preferred embodiment of the structure is reasonably transparent, at least enough so to disclose voids in the surrounding cement as it is being poured and tamped. Removal of the lid to view the channel member interior will disclose such voids, and the lid can then be replaced and the void filled.

Once the cement has hardened, the lid member with its ribs can be removed and the manhole will contain a sewer action resistant access channel with a very smooth wall, no pits, no snags, no highs or lows. The use of ribs on the lid are obviously not the only means by which the channel member 11 can be strengthened, for as an alternate configuration the channel member 11 itself can have external strengthening ribs, lateral or longitudinal, as an integral part of its own structure.

When the channel member is imbedded and the cement has hardened, the lid member can then be used in a variety of ways. The ribs can be removed, leaving holes 33 for water to drain down into the channel member, yet preventing large debris from entering the pipeline. If some kind of pressurized or high flow rate of flushing operation is desired in the pipeline as a post construction operation, then the holes 33 can, after removal of the ribs 29, be provided with the bobbers or floats 34 shown in FIGURE 1. During such operations the lid member 11 should be securely fastened to channel member 11 by the means shown in FIGURE 1 or other appropriate means. As mentioned previously, the ribs 29 can also be used in pipeline cleaning operations by providing the ribs 29 with holes 31 which will permit passage of water and small particles, but which will stop large debris.

As to the installation of the access channel in a pipeline, a standard length access channel can be used in those areas such as new home subdivisions and the like where the manholes can be put down precisely at the end of the last length of pipe, the channel installed, and the pipeline continue on its way. Such a standard length of channel has the plastic ring 18 of FIGURE 1, sealed and secured to the inlet spigot 16 in the factory, preferably using plastic as the sealing and securing agent.

In areas where there are already gas lines, underground electric lines, and water lines which must be avoided, and the location thereof is not precisely known, it is not always possible to know ahead of time the exact positioning of the manhole that must be installed. Of course, the use of standard short pipe lengths can be used to shift a manhole, but not if the shift needed is, say in the order of one-half foot, for pipe length is generally not available in that small a size.

To make provision for this problem, the ring 18 can be placed on spigot inlet 16 and not secured in place. The spigot inlet can be longer than normal and, being plastic, can be sawed off in the field to the desired length, and then the ring 18 secured in place where desired, preferably by a plastic sealing and securing compound.

Of course, the manner in which the present invention is employed is the same whether the particular configuration being used is merely a single channel member or a plural channel member. And, although specific embodiments of the present invention have been described and illustrated, it is to be understood that the same are by way of illustration and example only, and the invention is not limited thereto, as many variations will be readily apparent. The invention is to be given its broadest possible interpretation within the terms of the following claim:

I claim:
1. A preformed access channel for use in sewer lines, drainage lines, and liquid transport lines in general, said access channel comprising at least one substantially hollow tubular and longitudinally shaped channel member having at least two opposite end openings adapted for connecting said channel member into liquid transport lines, said channel member having an interior wall that is smooth and adapted in general for uninhibited liquid flow through said channel member, and said channel member being open on a portion of its side in a substantially longitudinal opening, said opening having a flanged rim to facilitate the fairing into said opening of a surrounding drainage surface, and a lid member shaped to substantially cover and close said longitudinal opening when placed thereupon, said lid member having a plurality of ribs extending therefrom which extend into said hollow channel member when said lid member is positioned upon said longitudinal opening thereof, said ribs having such size and shape that when said lid is positioned upon said longitudinal opening to close same the ribs contact the interior wall of said channel member, and said ribs being of sufficient strength to impart substantial rigidity to said channel member whereby the placing and tamping of fill material, concrete or the like about the exterior of said channel member will not harm it, said ribs being removable from said lid member to provide an unobstructed passage through said access channel, said lid having a substantially water tight and sewer action resistant seal, said seal contacting the flanged rim of said channel member opening when said lid is placed thereupon and providing a substantially water tight seal, said lid having holes therein, means associated with said holes for allowing water or other liquid to flow from the exterior of the lid and channel member into said channel member but preventing the flow of water or other liquid in the reverse direction, and means associated with said lid and channel member for securing and locking said lid to said channel member.

References Cited

UNITED STATES PATENTS

| 266,809 | 10/1882 | Greenleaf | 138—92 |
| 277,196 | 5/1883 | Barrett | 138—92 |
| 671,514 | 4/1901 | Grinsted | 138—92 X |
| 1,224,135 | 5/1917 | Burmeister | 138—92 X |
| 2,411,011 | 11/1946 | Troiel | 52—302 X |
| 2,688,291 | 9/1954 | Cannard | 52—302 |
| 3,037,326 | 6/1962 | Holloway | 52—577 X |
| 3,048,911 | 8/1962 | Almon | 52—221 X |
| 3,093,933 | 6/1963 | Slingluff | 138—92 X |
| 3,148,896 | 9/1964 | Chu | 138—92 X |

FOREIGN PATENTS

| 10,628 | 1/1905 | Great Britain. |
| 15,028 | 4/1896 | Great Britain. |
| 15,368 | 11/1893 | Great Britain. |
| 3,109 | 12/1883 | Great Britain. |
| 3,221 | 2/1894 | Great Britain. |
| 1,123 | 1/1903 | Great Britain. |

LAVERNE D. GEIGER, *Primary Examiner.*

B. KILE, *Assistant Examiner.*